United States Patent [19]

Edelmann et al.

[11] Patent Number: 5,145,260
[45] Date of Patent: Sep. 8, 1992

[54] ROLLING BEARING FOR LONGITUDINAL MOVEMENT

[75] Inventors: Ludwig Edelmann, Sulzthal; Hermann Glöckner; Zoltan Laszlofalvi, both of Schweinfurt; Uwe Mayer, Münnerstadt; Lothar Walter, Schweinfurt, all of Fed. Rep. of Germany

[73] Assignee: SKF Linearsysteme GmbH, Schweinfurt, Fed. Rep. of Germany

[21] Appl. No.: 698,662

[22] Filed: May 10, 1991

[30] Foreign Application Priority Data

May 11, 1990 [DE] Fed. Rep. of Germany ....... 4015124

[51] Int. Cl.⁵ ............................................. F16C 29/06
[52] U.S. Cl. ...................................................... 384/43
[58] Field of Search ............................. 384/43, 44, 45; 464/168

[56] References Cited

U.S. PATENT DOCUMENTS 4,469,380  9/1984  Cowles ................................. 384/43
4,514,017  4/1985  Walter et al. ........................ 384/43
5,051,001  9/1991  Jacob ................................... 384/43

FOREIGN PATENT DOCUMENTS 2725355  4/1984  Fed. Rep. of Germany .

Primary Examiner—Lenard A. Footland
Attorney, Agent, or Firm—Rosen, Dainow & Jacobs

[57] ABSTRACT

A rolling bearing for longitudinal movement has a cage with its inner surface surrounding a shaft. The cage has axially extending races for loaded balls and axially extending return races for unloaded balls, as well as a cover on each of its two ends. Each cover has turn around races connected between the ends of a race and a return race. The races, return races and turn around races have slits extending along the races and open to the shaft. Each turn around race in the covers is bounded by a curved shoulder section on the inner surface of the cage and extending along the turn around race, and a curved inner wall section of the cover extending parallel to the curved shoulder wall section of the cage.

11 Claims, 3 Drawing Sheets

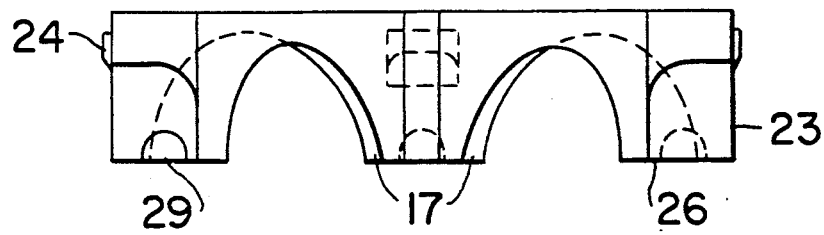
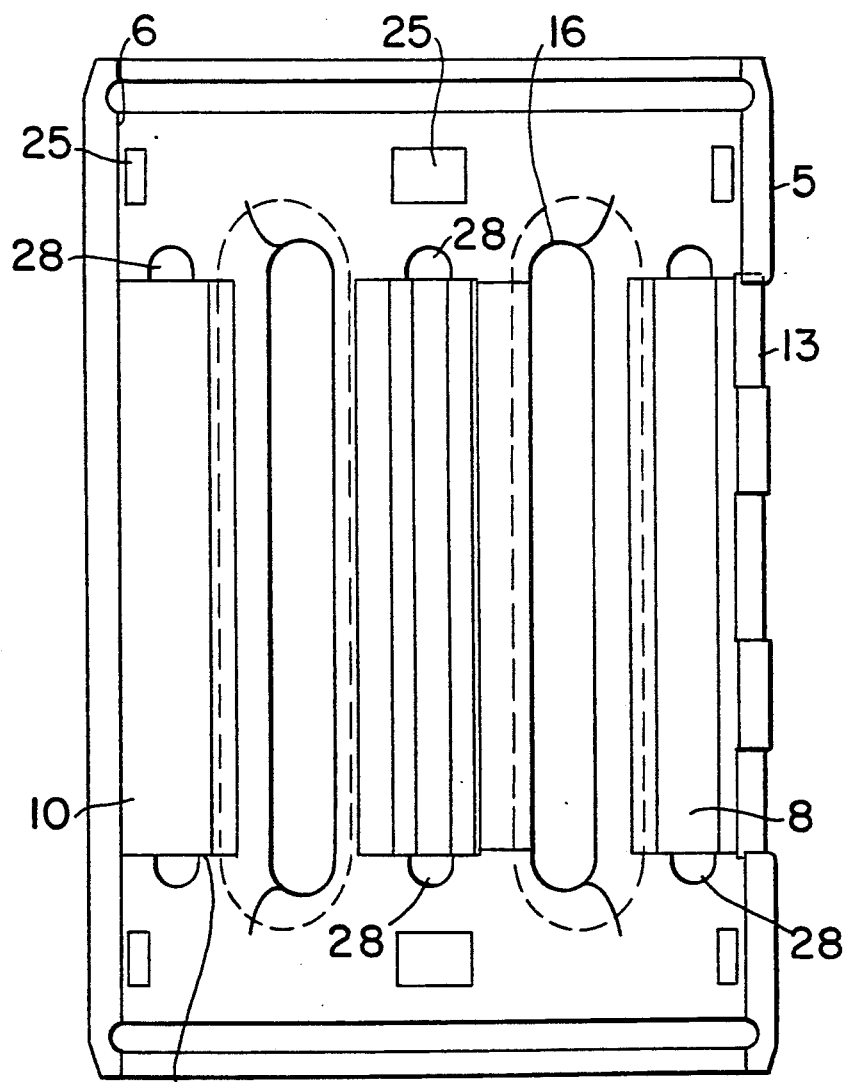

ROLLING BEARING FOR LONGITUDINAL MOVEMENT

FIELD OF THE INVENTION

This invention relates to a rolling bearing for longitudinal (i.e. lengthwise) movement.

BACKGROUND OF THE INVENTION

A rolling bearing of the above type is disclosed in DE-PS27 25 355. In this bearing, both turn around U-turn races of each row of balls are closed in the radially inward direction toward the shaft, by a web of the cage. In operation of this known rolling bearing, the balls move along the axially extending forward and return races and are lifted radially from the shaft by hitting against a ball lifting ramp at the inlet end of the web. The respective lifting movement and radial displacement of the balls, however, generate impact forces in the rolling bearing, which can result in the generation of undesirable running noise in the rolling bearing.

The lifting ramps of the rolling bearing must be formed in the cage and in the respective cover with complicated tools. In addition, the lifting ramps of known rolling bearing are also relatively fragile as a result of their thin walled construction.

SUMMARY OF THE INVENTION

This invention is directed to the provision of a rolling bearing for lengthwise movement of the above type, which runs extremely noiselessly, is robust, and also can be produced especially economically.

In the rolling bearing for lengthwise movement of the invention, the balls of each row arriving from the forward race or the return race, run smoothly and noiselessly into or out of the ball guiding turn around race of the respective cover. The balls of each row are turned around without abrupt radial displacement from the forward races to the respective turn around races and back to the return races connected thereto. In this manner the balls experience especially small impact in their operational movement in the ball cage. The rolling bearing of the invention consequently is especially quiet. Moreover, it can advantageously have small radial dimensions.

The curved running shoulder section in the bore of the cage and the curved running wall sections of the respective cover are, in accordance with the invention, axially formed in an economical manner using axial work tools. As a result, the cage as well as the two respective covers have a shape which results in a relatively shock free and robust construction for the rolling bearing.

In another feature of the invention, the unloaded balls of each endless row project through slits of the return and turn around races and are guided by the outer surface of the shaft.

In a still further feature of the invention, the balls of each row are held in the bearing by the inner edges of slits in the cage, so that they cannot fall out of the bearing when the shaft is not installed therein.

In the arrangement in accordance with the invention, the shapes of the cage and two covers of the bearing enable especially economically production of the rolling bearing.

In another feature of the invention, the advantage is obtained that the forward and return races of the cage, as well as the turn around races of the two covers, can be formed in a mold with axial slides, so that economical mass production of the cage and the covers can be employed in a simple molding device (without radial slides).

BRIEF DESCRIPTION OF THE DRAWING

In order that the invention may be more clearly understood, it will now be disclosed in greater detail with reference to the accompanying drawing, wherein:

FIG. 3 is a longitudinal cross section through one of the two covers of the rolling bearing shown in FIG. 1, in unassembled condition;

FIG. 4 is a longitudinal cross section of the cage of the rolling bearing illustrated in FIG. 1, in unassembled condition;

DETAILED DISCLOSURE OF THE INVENTION

Figure 1:
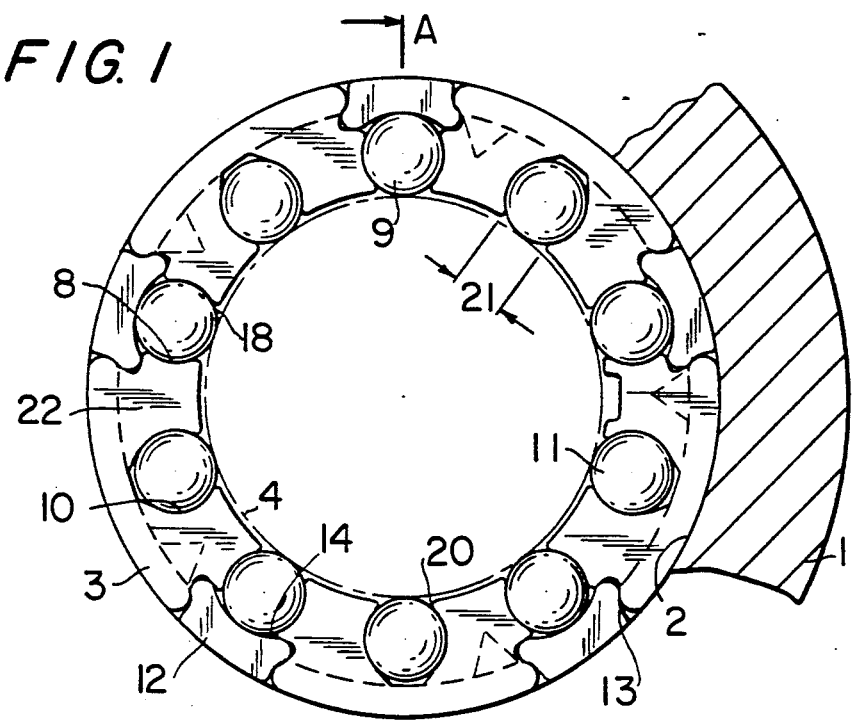
FIG. 1 is a cross sectional view through a rolling bearing for lengthwise movement, assembled in the bore of a housing, according to the invention.

Referring now to FIG. 1, a laterally symmetric rolling bearing for lengthwise movement includes a housing 1 having a cylindrical bore 2, and a cage 3. The cage 3 is sleeve shaped, and its inner surface completely surrounds a cylindrical shaft 4, shown in dash-dot lines in FIGS. 1 and 2.

Figure 2:
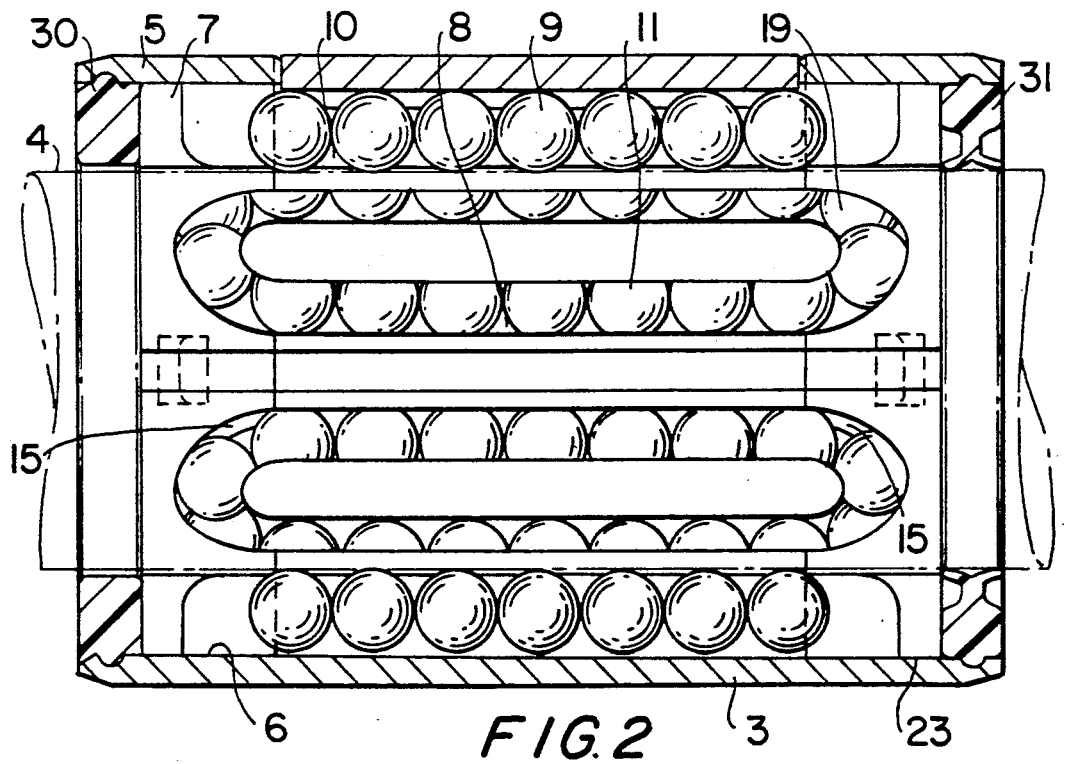
FIG. 2 is a longitudinal cross section taken along lines A—A of FIG. 1, without the housing.

An annular cover 7 is fastened to each end of the cage, the covers 7 being seated on cylindrical bore surfaces 6 at the respective end sections 5 of the cage 3, as illustrated in FIG. 2.

The cage 3 has axially extending races 8 for loaded balls 9 and axially extending return races for unloaded balls 11. The cage 3 and its two covers 7 are of a molded elastomer material, and are produced in an injection molding process in a mold (not illustrated). The mold for the cage can be provided, in a known manner, with axially extending slides for forming the races 8 and return races 10 of the cage.

The races 8 and return races 10 are arranged alternately about the circumference of the cage 3. A race element 12 of steel is provided radially outwardly of each race 8 of the cage. Each race element 12 is snapped into a radially extending through opening 13 of the cage 3, so that it is held captive therein. The race elements are supported radially outwardly by the bore of the housing 1 and are provided with longitudinally extending groove shaped races 14 for radially outwardly supporting the loaded balls 9.

Upon axial back and forth movement of the shaft 4, the balls 9 roll between the race 14 of the respective race element 12 and a cylindrical outer surface of the shaft 4, and thereby radial forces are transferred from the shaft 4 to the bore 2 of the housing 1 via the race elements 12.

The insides of the two covers 7 have, on their axially inner sides, circumferentially distributed semicircular turn around races 15. Each turn around race 15 joins an end of a race 8 to an end of an adjacent return race 10. As a consequence, each turn around race 15 is limited by a corresponding semicircular curved shoulder section 16 on the inner surface of the cage 3 and a curved inside section 17 of the cover 7 that is opposite the shoulder section 16 and parallel thereto.

Each combination of a race 8, a return race 10 and the axial ends of two turn around races 15 aligned therewith, form a closed race, in which an endless row of balls 9, 11 are installed.

Each closed race of the rolling bearing has a slit that is open to the shaft and extends therealong, the slit being comprised of an axially extending slit 18 of the race 8, a semicircular extending slit 19 of the two turn around races and an axially extending slit 20 of the return race 10. As a consequence, one end of each slit 19 of each turn around race 15 joins an end of the slit 18 of the connecting race 8, and the other end thereof joins the slit 20 of the connecting return race 10.

The radially inner width 21 of the slit 19 of the turn around race 15 is exactly the same as the inner slit width of the return race 20, and these slits are sufficiently wide that the unloaded balls 11 can extend radially inward to contact the shaft 4 through the slits 19 and 20 and thereby be radially guided by the shaft 4.

The slit width 21 is moreover somewhat smaller than the diameter of the balls 11. In a similar manner, the radially inner slit width of the slits 18 of each race 8 is somewhat smaller than the diameter of the balls 9. As a consequence the balls 9, 11 cannot fall radially from the rolling bearing, even if the shaft 4 is pushed out of the rolling bearing and taken away.

The turn around races 15 of the two covers 7 have lateral guide walls formed by the shoulder sections 16 and the wall sections 17, which have substantially circular shaped cross sections partially encircling the balls 11. Similarly, the axially extending races 8 and return races 10 have lateral guide walls, with substantially circular section shaped cross sections which partially encircle the balls 9,11.

As a result, the races 8 and return races 10 and the turn around races 15 have cross section centers that are located on a common cylindrical surface 22 concentric with the axis of the shaft 4. The bore surface 6 of each end section 5 of the cage 3 radially outwardly covers the turn around race 15 of the respective cover 7.

Each cover 7 has an outer surface 23 seated on the respective bore surface 6, the outer surfaces 23 each being provided with circumferentially extending radially outwardly projecting holding catches 24. The holding catches 24 are snapped in respective radial throughgoing recesses in the bore surface 6 of the cage 3 in a form locking manner (see FIGS. 3 and 4).

In addition, each cover has an axially inwardly directed flat end face sections 26. Each end face section 26 is located on the cover 7 between two circumferentially adjacent turn around races 15. Collectively the end face sections 26 of the cover 7 are fixedly arranged, with each one engaging an opposed flat axial end support surface section 27 of the cage 3.

In the above described arrangement, each projections 28, which are adapted to be received in respective round recesses 23 of the respective end surface 26 (see FIGS. 3 and 4).

In the rolling bearing cage illustrated in FIG. 2, a sealing ring 30 is inserted in the left end of the cage 3, which forms a narrow sealing gap with the outer surface of the shaft 4. At the right end of the cage 3, a sealing ring 31 has sealing lips that slide on the outer surface of the shaft 4 in the longitudinal direction.

Figure 5:
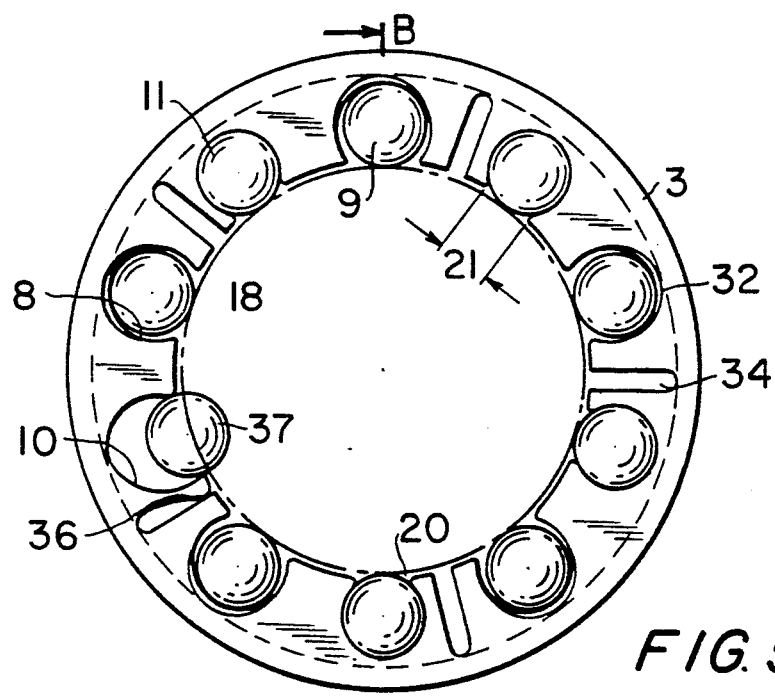
FIG. 5 is a cross section through a modification of the rolling bearing for lengthwise movement.
Figure 6:
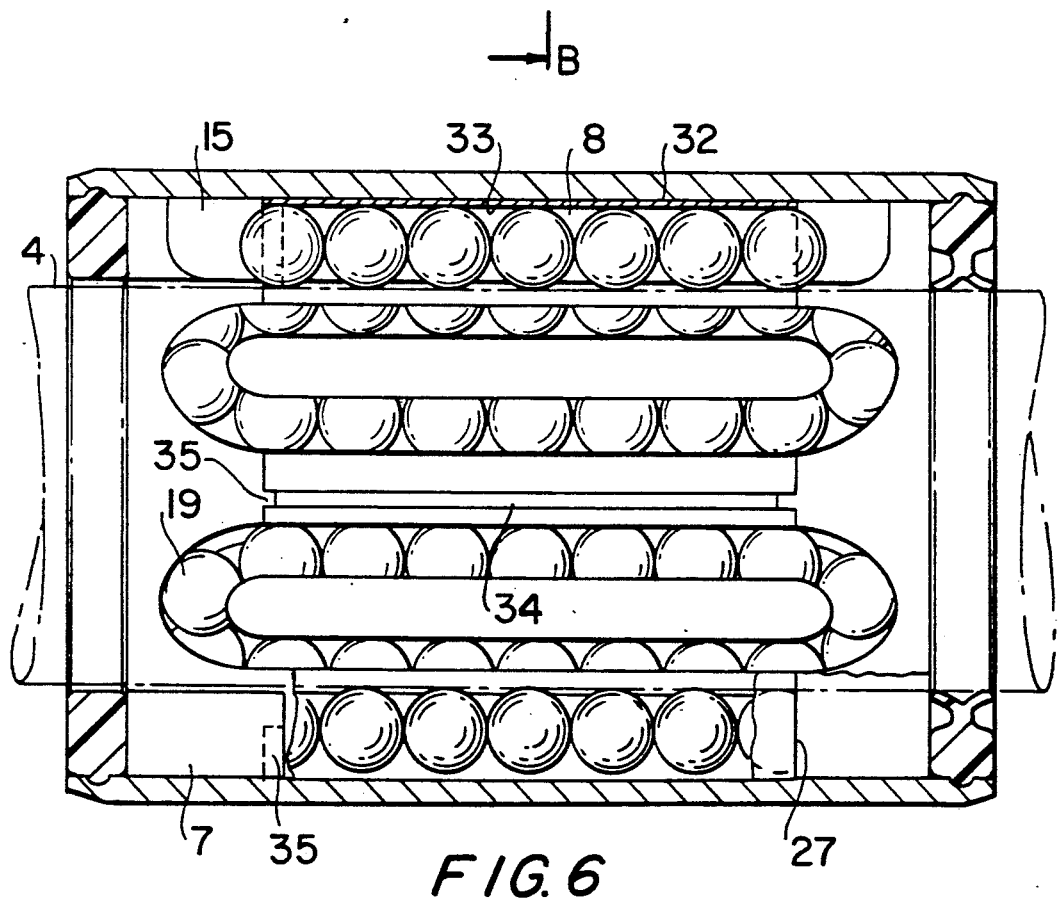
FIG. 6 is a longitudinal cross section view taken along lines B—B of FIG. 5

FIGS. 5 and 6 illustrate a modified rolling bearing for longitudinal movement, which is formed in a manner similar to the bearing described with reference to FIGS. 1–4. Thus, the bearing of FIGS. 5 and 6 has axially extending races 8 and return races 10 in a cage 3 and semicircular return races 15 in two end covers 7. The races 8, 10 and 15 also have slits 18, 19 and 20 opening toward the shaft 4.

In the modified arrangement, however, each race element is made from a wear resistent hard ceramic or metal layer 32 on a radial outer wall section 33, which produces a circular cross section race 8 formed in the cage 3. In order to apply the layer 32, a gun spraying or evaporation plasma sputtering process can be used.

The cage 3 has two end covers 7, whose flat end surface sections are each opposite a flat support surface section 27 of the cage 3, and these surfaces are inseparably joined e.g. by clamping or supersonic welding.

In its bore the cage 3 has radial grooves 34 formed in a molding process with axial slides (not shown), each of which extends axially through two opposed support surface sections 27 of the cage. Each groove 34 is radially inwardly open to the shaft, and radially outwardly closed. On one or both ends, at least one groove 34 formlockingly engages an axially inwardly extending projection 35 from the respective cover 7 that extends into the groove from the support surface section thereof.

Each groove 34 extends directly adjacent at least one of the return races 10 so that a thin walled bending elastic cage section 36 is formed between the return race 10 and the groove 34.

When filling the cage 7 with balls 9, 11, whether or not the cage has a cover 7, each ball is introduced in the bore of the cage 3, and from there it is pushed radially outwardly and snapped in the return race 10 (see ball 37 in FIG. 5). Since the cage sections 36 are somewhat bendingly elastic in the circumferential direction, the inner width 21 of the slits 20 can be expanded momentarily during ball filling.

It is within the scope of the invention to provide changes in the above described embodiments of the invention. For example, different size balls can be provided in the rows in the rolling bearing for lengthwise movement. In this case the loaded balls of a row with the larger balls can also run in a longitudinally directed race channel in the otherwise cylindrical shaft, and thereby tranfer a torque between the shaft and the respective race element. The respective return race then extends in a somewhat radially outward displaced position, with respect to the loaded race, so that the unloaded balls in the two turn around races and in the return races joined thereto are guided by cylindrical sections of the shaft.

It is also not necessary for the cage to be formed as a circumerentially closed housing. In addition, the cage and respective cover can also have a common longitudinally throughgoing slit, so that the cage only partially surrounds the shaft with its inner surface. Support elements of a base or the like can then extend in this slit and be connected rigidly to the shaft, to support the stationary shaft on the base, the shaft serving as a rail for the axially movable cage.

While the invention has been disclosed and described with reference to two embodiments, it will be apparent that variations and modification may be made therein, and it is therefore intended in the following claims to cover each such variation and modification as falls within the true spirit and scope of the invention.

What is claimed is:

1. In a rolling bearing for lengthwise movement along a shaft, comprising a cage mounted in the bore of a housing and having an inner surface adapted to at least partially encircling a shaft, the cage having at least one axially extending race for guiding balls rolling between the shaft and outer race elements, and at least one axially extending return race for guiding unloaded balls, the bearing further having an end cover mounted on each end thereof and having a turning around race connected to a respective end of a race for loaded balls and a return race, to thereby guide an endless row of balls, the races for loaded balls and the return races having a slit extending therealong and opening to the shaft, the improvement wherein the turn around races of the two covers each have a slit opening toward the shaft and joining the slits of the races for loaded balls and the return race, the turn around races being bounded by curved shoulder sections on the inner surface of the cage extending along the turn around race and curved inside wall sections parallel to the shoulder sections and extending in the respective end cover.

2. The rolling bearing of claim 1 wherein the slits of the turn around races and return race are sufficiently wide for the balls in the turn around race of each cover and in the return race of the cage to protrude radially inwardly through the respective slits, whereby the balls in the turn around races and return race are guided on the shaft.

3. The rolling bearing of claim 2 wherein the radial inner slit width of the race for loaded balls and the return races of the cage and the turn around races of the two covers is smaller than the diameter of the balls.

4. The rolling bearing of claim 1 wherein the race for loaded balls and return race of the cage, and the turn around races of the two covers, have lateral guide walls, which partially encircle the balls therein with substantially circular section cross section contours.

5. The rolling bearing of claim 1 wherein the races for loaded balls and the return race of the cage and the turn around races of the two covers have cross section centers that lie on a common cylindrical surface concentric with the axis of the shaft.

6. The rolling bearing of claim 5 wherein each cover has an outer surface with circumferentially arranged radially outwardly projecting holding catches snapped into corresponding radial recesses in the bore surface of the cage.

7. The rolling bearing of claim 1 wherein each end of the cage has an end section with a bore surface radially outwardly covering the cover at the respective end of the cage.

8. The rolling bearing of claim 1, wherein each cover has an axially inwardly extending end surface section between two circumferentially adjacent turn around races and fixedly mounted to an opposed support surface section of the cage.

9. The rolling bearing of claim 8 wherein each support surface of the cage has an axially extending projection held in a form locking manner in a recess of the end surface section of the respective cover.

10. The rolling bearing of claim 1 wherein the cage is of a molded material.

11. The rolling bearing of claim 1 wherein the two covers are of a molded material.

* * * * *